(12) United States Patent
Voss et al.

(10) Patent No.: US 8,651,430 B2
(45) Date of Patent: Feb. 18, 2014

(54) SPOILER FOR AN AERODYNAMIC BODY OF AN AIRCRAFT

(75) Inventors: Timo Voss, Hamburg (DE); Joachim Loerke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1078 days.

(21) Appl. No.: 12/449,705

(22) PCT Filed: Feb. 25, 2008

(86) PCT No.: PCT/EP2008/001481
§ 371 (c)(1),
(2), (4) Date: Sep. 9, 2009

(87) PCT Pub. No.: WO2008/101735
PCT Pub. Date: Aug. 28, 2008

(65) Prior Publication Data
US 2010/0320332 A1    Dec. 23, 2010

(30) Foreign Application Priority Data

Feb. 23, 2007   (DE) .......................... 10 2007 009 060

(51) Int. Cl.
*B64C 9/00* (2006.01)
*B64C 9/32* (2006.01)
(52) U.S. Cl.
USPC .......................................... 244/217; 244/215
(58) Field of Classification Search
USPC .................... 244/211–217, 219, 99.14, 46
See application file for complete search history.

(56) References Cited

U.S. PATENT DOCUMENTS

| 2,006,391 A | * | 7/1935 | Granville | 244/203 |
| 2,152,835 A | * | 4/1939 | Bolas | 244/217 |
| 2,418,273 A | | 1/1947 | Moore | |
| 3,456,904 A | * | 7/1969 | Dorand | 244/207 |
| 3,756,089 A | * | 9/1973 | Haladay | 74/96 |

(Continued)

FOREIGN PATENT DOCUMENTS

| DE | 10 2004 049 504 | 4/2006 |
| EP | 1 516 813 | 3/2005 |
| FR | 2 138 629 | 1/1973 |

OTHER PUBLICATIONS

International Search Report.
Chinese Office Action dated Apr. 22, 2011 in CN 200880013144.3 along with an English translation of same.
German Office Action dated Oct. 27, 2008 in DE 10 2007 009 060.0-22 along with an English translation of relevant portions of same.

*Primary Examiner* — Tien Dinh
*Assistant Examiner* — Michael A Fabula
(74) *Attorney, Agent, or Firm* — Collard & Roe, P.C.

(57) ABSTRACT

The invention pertains to a spoiler (5) for an aerodynamically active surface of an aircraft (1), particularly for an airfoil of an aircraft, wherein said spoiler is supported on the aerodynamically active surface such that it is articulated about an axis (11) extending transverse to the air flow direction and can be adjusted relative to the air flow. According to the invention, the spoiler features two or more segments (6, 7) that are arranged behind one another referred to the air flow direction and extend transverse to the air flow direction, wherein said segments are connected to one another in an articulated fashion and can be adjusted to different angles referred to the air flow. The successively arranged segments of the spoiler (5) can be actuated, in particular, by means of an actuating device (8, 9, 10) in such a way that the rear segment (7) is adjusted relative to the air flow by a greater angle than the front segment (6).

3 Claims, 3 Drawing Sheets

(56) References Cited

U.S. PATENT DOCUMENTS

| | | | |
|---|---|---|---|
| 3,799,474 A | 3/1974 | Schaerzler | |
| 4,120,470 A | 10/1978 | Whitener | |
| 4,932,613 A * | 6/1990 | Tiedeman et al. | 244/213 |
| 5,098,043 A * | 3/1992 | Arena | 244/215 |
| 5,735,485 A | 4/1998 | Ciprian et al. | |
| 6,123,297 A * | 9/2000 | Berry | 244/214 |
| 6,981,676 B2 | 1/2006 | Milliere | |
| 2006/0202089 A1 | 9/2006 | Reckzeh et al. | |
| 2010/0019096 A1 * | 1/2010 | Pecora et al. | 244/213 |
| 2010/0308162 A1 * | 12/2010 | Gartelmann | 244/99.3 |

\* cited by examiner

SPOILER FOR AN AERODYNAMIC BODY OF AN AIRCRAFT

CROSS REFERENCE TO RELATED APPLICATIONS

This application is the National Stage of PCT/EP2008/001481 filed on Feb. 25, 2008, which claims priority under 35 U.S.C. §119 of German Application No. 10 2007 009 060.0 filed on Feb. 23, 2007. The international application under PCT article 21(2) was published in English.

BACKGROUND OF THE INVENTION

1. Field of the Invention

The invention pertains to a spoiler for an aerodynamic body of an aircraft with an aerodynamically active surface, particularly for an airfoil of an aircraft, wherein said spoiler is supported on the aerodynamic body such that it is articulated about an axis extending transverse to the air flow direction and can be adjusted relative to the air flow.

2. The Prior Art

In the most general sense, spoilers are surfaces provided on aerodynamically active surfaces of aircraft which can be adjusted relative to the air flowing along the surface in order to fulfill their function. The most widely used spoilers are provided on the upper side of the airfoil of an aircraft, namely in the rear region thereof, and used for lift dumping, as well as for increasing the lift and for roll control purposes in cooperation with a high-lift surface arranged behind the main wing. Lift dumping is realized, for example, at the end of a landing maneuver by adjusting the spoilers that are supported such that they are articulated about an axis extending transverse to the air flow direction upward relative to the air flow, wherein this upward adjustment leads to an abrupt separation of the flow at this location of the air flow profile and therefore to a massive lift reduction. On the other hand, spoilers may also be used for increasing the lift, particularly within the range of small angles of attack (zero-lift), wherein the spoilers are lowered and adjusted relative to an air flow while the high-lift surfaces are extended, and wherein said air flow flows from the underside of the main wing to the upper side of the high lift surface through a gap between the high-lift surface and the main wing that is exposed when the high-lift surface is extended.

In order to improve the lift within the range of the aforementioned small angles of attack, it is currently common practice to essentially utilize double-gap or multi-gap flaps, namely so-called Fixed Vane flaps or MCS (Multi Control Surface) components. The aerodynamic effectiveness of these systems is associated with greatly increased complexity with respect to the structure and the system architecture, as well as with significant additional weights. However, additional weight basically impairs the cruising performance and the additional system components and the increased complexity result in higher manufacturing, operating and maintenance costs.

A conventional spoiler is typically formed by a spoiler surface that is supported by means of an articulation such that it can be pivoted about an axis that essentially extends transverse to the air flow direction, i.e., essentially in the wingspan direction of the airfoil, as illustrated in the form of a cross section in FIG. 1. This figure shows an airfoil, in which the spoiler 5 is supported in a pivoted fashion on the upper rear side of the main wing 1 by means of a spoiler articulation 11. A high-lift surface 4 is illustrated in the extended state such that a gap 16 is exposed, through which the air flows from the underside of the main wing 1 to the upper side of the high-lift surface (landing flap) 4. The excursion of the spoiler 5 therefore takes place in the form of a rotational movement about the articulation 11 such that the spacing between the rear edge of the spoiler 5 and the upper side of the high-lift surface 4 is reduced and the air flow is accelerated at this location in order to increase the lift accordingly. When the spoiler 5 is lowered in order to increase the wing curvature, the articulation line on the articulation 11 acts as an aerodynamic limitation because the flow is no longer able to follow the discontinuous wing surface at this location and therefore separates.

The basic function of a spoiler is suitable for three applications:

a) In the simplest instance of a roll control function, the gap is closed and the spoiler acts like a split flap at small excursions. In simple terms, such a split flap deflects the flow behind the wing in the direction of excursion and therefore generates a "lifting" force opposite to the direction of excursion. It appears as if the rear edge of the wing is virtually displaced analogous to a normal pivoted flap. The drag increases due to the eddying of the separated flow on the "inner side" of the opened spoiler, wherein this increased drag is only partially desirable as a secondary effect in this case. A wing that moves upward as the lift increases due to an aileron excursion usually has a tendency to lag and the side being lowered has a tendency to lead. The additional drag of the spoiler counteracts this tendency to lead. At a symmetric excursion on both wing sides, the gliding angle can be influenced without excessively increasing the drag during the descent from the cruising altitude.

b) Both effects are also utilized in the equally simple instance of the lift dumping function (primarily at full excursion during the roll-out on the ground after landing): the loss of lift and the significant deceleration effect resulting from the separated flow on the inner side of the spoiler and the upper side of the high-lift system. The "accumulation" on the front side of the spoiler also has a deceleration effect. It is attempted to keep the aircraft on the ground (lift reduction) and naturally also to bring the aircraft to a standstill (deceleration effect).

c) It is attempted to increase the lift in slow flight during takeoff/landing maneuvers. Two effects can be achieved with the spoiler in this case: "influencing the effective curvature of the overall system" and "optimal design of the gap between the participating high-lift elements" (in this case spoiler/flap).

SUMMARY OF THE INVENTION

The invention is based on the objective of developing an improved spoiler for an aerodynamic body of an aircraft. The invention aims, in particular, to develop an improved spoiler for an airfoil of an aircraft comprising a main wing and a high-lift surface that is arranged on the rear side of the main wing and can be extended such that an air flow gap is exposed.

This objective is attained with a spoiler as described herein. Advantageous embodiments and additional developments of the inventive spoiler are also disclosed.

The invention proposes a spoiler for an aerodynamically active body or surface of an aircraft, particularly for an airfoil of an aircraft, wherein said spoiler is supported on the aerodynamically active surface such that it is articulated or pivoted about an axis extending transverse to the air flow direction and can be adjusted or inclined relative to the air flow. According to the invention, the spoiler comprises at least two segments that are arranged behind one another referred to the air flow direction and extend transverse to the air flow direction, wherein said segments are connected to one another in an articulated fashion and can be adjusted or inclined to different angles relative to the air flow.

In this context, the term inclination relative to the air flow means that the spoiler or its segments can be respectively adjusted relative to the air flow by a certain angle of inclination that may be positive or negative from an initial position. With respect to a spoiler that is arranged on the upper side of an airfoil and at the rear end thereof, this means that the spoiler or its segments can be respectively adjusted upward and/or downward this means in a first direction transverse to the assumed air flow direction and/or in a second direction which is opposed to the first direction.

One advantage of the inventive spoiler can be seen in that its division into several individual segments makes it possible to better adapt the spoiler to the flow to be influenced such that its aerodynamic effectiveness can be improved. Due to the increased effectiveness of the spoiler in its function as a roll control surface, as well as a "lift dumper" for eliminating the lift or for increasing the lift, it is possible to either reduce the overall spoiler surface or the angle of excursion.

According to one embodiment of the invention, it is proposed that the spoiler features the following: a first segment that is situated in front referred to the air flow direction and connected to a supporting structure of the aerodynamic body having an aerodynamically active surface, particularly the main wing, by means of a first articulation or joint and at least one second segment that is situated at the rear or behind the first segment referred to the air flow direction and (respectively) connected to a segment situated in front thereof, i.e., the first segment or at least one second segment.

The segments of the spoiler that are arranged behind one another can be preferably actuated by means of an actuating device in such a way that the rear segment can be (upwardly or downwardly) adjusted relative to the air flow by a greater angle than the respective front segment. It would be possible, in particular, that the respective rear segment referred to the air flow direction is subjected to a more significant excursion from an initial position than the respective segment situated in front thereof. The actuation device is driven by a drive device. In this regard, the drive device can be controlled or commanded by a flight control device.

According to one embodiment of the invention, the actuating device features actuators that are respectively coupled to the spoiler segments arranged behind one another and adjust the (respective) rear segment relative to the air flow by a greater angle than the (respective) front segment.

In this case, a first actuator may be coupled between an abutment on the front segment of the spoiler and an abutment on the supporting structure of the main wing, and a second actuator may be coupled between an abutment on the front segment and an abutment on the rear segment.

The actuating device in the form of actuators that cooperate with abutments may be realized such that an upward adjustment of the first spoiler segment by means of the first actuator causes the second actuator to adjust the second spoiler segment upward by a greater angle while a downward adjustment of the first spoiler segment by means of the first actuator causes the second actuator to adjust the second spoiler segment downward by a greater angle.

According to another embodiment of the invention, the actuating device features an actuator for adjusting the spoiler that is coupled between a supporting structure of the aerodynamically active surface, i.e., particularly the main wing or a supporting structural component of the main wing, and the spoiler, as well as a coupling mechanism that causes the rear segment to be adjusted relative to the air flow by a greater angle than the respective front segment during an adjustment of the spoiler.

In this case, it would be possible, in particular, that the actuator is coupled to the front segment of the spoiler and the coupling mechanism is coupled to the (respective) rear segment of the spoiler.

In this embodiment, it would be possible that the actuator is coupled between the supporting structure of the aerodynamic body of the aerodynamically active surface and the front spoiler segment, and that the coupling mechanism features a toggle lever or a first lever that is rigidly or rotatively connected to the rear segment and a second lever that is coupled between the first lever and an abutment at articulations, wherein the toggle lever forms a step-up gear that causes the actuator to adjust the rear segment by a greater angle than the front segment during the actuation of the spoiler. The abutment may be arranged, in particular, on a supporting structural component of the aerodynamic body or the aerodynamically active surface. According to one variation of this embodiment, it is proposed that the first lever is rigidly connected to the lower side of the rear spoiler segment and bent at a right angle such that it extends forward underneath the front spoiler segment, wherein the front end of the first lever is coupled to one end of the second lever by means of a first coupling articulation, wherein the second lever is arranged in an angled fashion relative to the first lever and fixed on said abutment with its other end by means of a second coupling articulation, and wherein the extension of the toggle lever caused by an upward adjustment of the first spoiler segment by means of the actuator causes the second spoiler segment to be upwardly adjusted by a greater angle and the angling of the toggle lever caused by a downward adjustment of the first spoiler segment by means of the actuator causes the second spoiler segment to be downwardly adjusted by a greater angle.

According to one embodiment of the invention, the abutment, on which the second lever is fixed by means of the second coupling articulation, is arranged on the supporting structure of the aerodynamically active surface.

According to another embodiment of the invention, the abutment, on which the second lever is fixed by means of the second coupling articulation, is formed by a point of the actuator, particularly by a base point of the actuator, at which the actuator is connected to the supporting structure of the aerodynamic body or the aerodynamically active surface.

According to one embodiment of the invention, the spoiler is provided on an airfoil of an aircraft that comprises a main wing and a high-lift surface that is arranged on the rear side of the main wing referred to the air flow direction and can be extended from a retracted position such that a gap conducting air from the underside of the main wing to the upper side of the high-lift surface is exposed between the main wing and the high-lift surface, wherein the spoiler is arranged on the upper side of the main wing and can be pivoted about an axis extending in the wingspan direction of the airfoil.

According to one variation of this embodiment, it is proposed that the spoiler can be adjusted upward in the sense of a lift reduction, wherein the rear segment is upwardly adjusted relative to the air flow by a greater angle than the front segment, wherein the spoiler can be adjusted downward into the gap in the sense of a lift increase when the high-lift surface is extended, and wherein the rear segment is downwardly adjusted relative to the air flow by a greater angle than the front segment. One significant advantage of the latter-mentioned variation is that the division of the spoiler into several individual segments makes it possible to realize a greater maximum angle of excursion without a separation of the flow such that an increased aerodynamic effectiveness in the high-lift region is achieved. Likewise, the increased excursion provides greater freedom in designing the flap kinematics because the gap between the spoiler and the flap can be adjusted in an optimized fashion by means of a corresponding spoiler excursion. The inherently limited design freedom, in particular, of circular arc kinematics of the high-lift flap (Dropped Hinge Flap) can be advantageously broadened. Due to the simple design, significant advantages with respect to weight, structural and system complexity as well as maintenance are realized while simultaneously achieving a high aerodynamic effectiveness.

BRIEF DESCRIPTION OF THE DRAWINGS

Embodiments of the invention are described below with reference to the figures.

The figures show:

FIGS. 3A, 3B and FIGS. 4A, 4B respectively show a first embodiment of the invention in the form of a somewhat enlarged schematic cross-sectional representation, wherein this figure shows an actuating device with a single actuator that serves for adjusting both spoiler segments in cooperation with a coupling device that causes a forced coupling, and wherein FIGS. 3A, 3B show the high-lift function of the spoiler that is subjected to a downward excursion and FIGS. 4A, 4B show the "lift dumper" function or roll control function of the spoiler that is subjected to an upward excursion, and FIG. 5 and FIG. 6 respectively show a second embodiment of the invention in the form of an additionally enlarged schematic cross-sectional representation, wherein this figure shows an actuating device with two actuators that serve for adjusting the two spoiler segments, and wherein FIG. 5 shows the "lift dumper" function or roll control function of the spoiler that is subjected to an upward excursion and FIG. 6 shows the high-lift function of the spoiler that is subjected to a downward excursion.

DETAILED DESCRIPTION OF THE DRAWINGS

Figure 2:
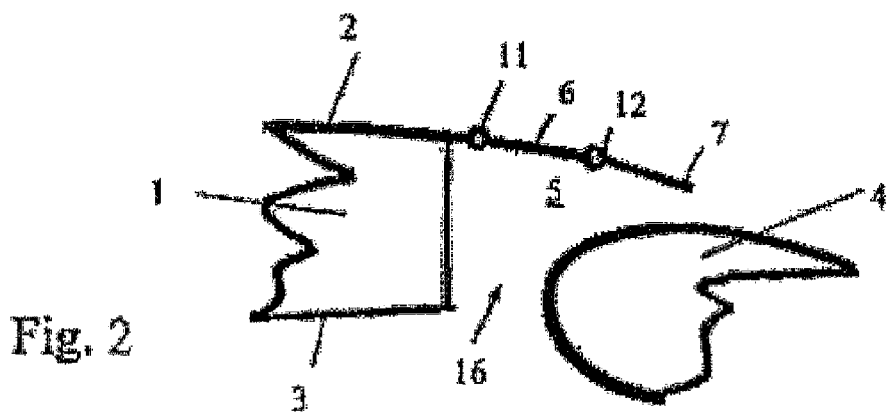
FIG. 2 shows the principle of a multi-segment spoiler according to one embodiment of the invention in the form of a schematic cross-sectional representation, wherein the spoiler is arranged on the airfoil of an aircraft with high-lift flap.

FIG. 2 shows part of an airfoil of an aircraft that features a main wing 1, a high-lift surface 4 and a spoiler 5 arranged on the main wing 1. The high-lift surface 4 is arranged on the rear side of the main wing 1 referred to the air flow direction and can be extended from a retracted position such that a gap 16 leading from the underside of the main wing 1 to the upper side of the high-lift surface 4 is exposed. FIG. 2 shows the high-lift surface 4 in the extended state, in which the gap 16 between the main wing 1 and the high-lift surface 4 is exposed. The spoiler 5 is arranged on the upper side of the main wing 1, namely at the rear end thereof referred to the air flow direction, and supported such that it can be pivoted about an axis extending in the wingspan direction of the airfoil by means of a first articulation 11.

In the embodiment shown in FIG. 2, the spoiler 5 features two segments 6, 7 that are arranged behind one another referred to the air flow direction and extend transverse to the air flow direction, i.e., essentially in the wingspan direction of the airfoil. The spoiler segments 6, 7 are connected to one another by means of a second articulation 12 and can be adjusted to different angles relative to the air flow. This means that the spoiler 5 features the following: a first segment 6 that is situated in front referred to the air flow direction and is connected to a supporting structure of the main wing 1 by means of the first articulation 11 and a second segment 7 that is situated at the rear referred to the air flow direction and connected to the first segment 6 situated in front thereof by means of said second articulation 12. In contrast to the embodiment illustrated in FIG. 2, it would also be possible to provide more than two segments behind one another referred to the air flow direction, wherein these segments are connected to one another by a correspondingly larger number of articulations. In this case, the respective rear segment can be (upwardly or downwardly) adjusted relative to the air flow by a greater angle than the respective segment situated in front thereof.

In the embodiment shown, the successively arranged segments 6, 7 of the spoiler 5 can be actuated by means of an actuating device in such a way that the rear segment 7 is adjusted relative to the air flow by a greater angle than the front segment 6 as illustrated in FIGS. 3 and 4.

Figure 3A:
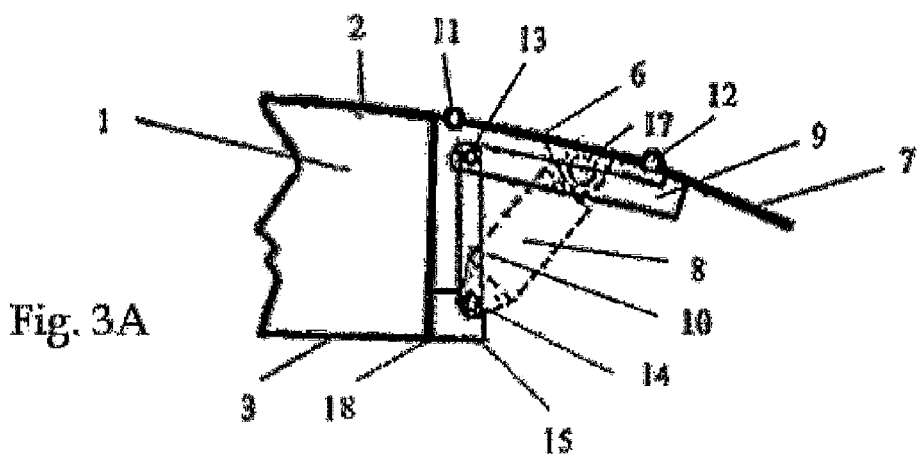
Figure 3B:
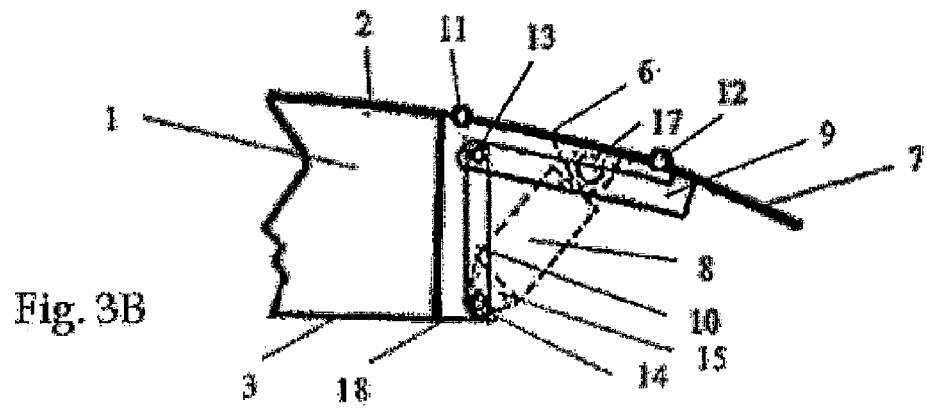
Figure 4A:
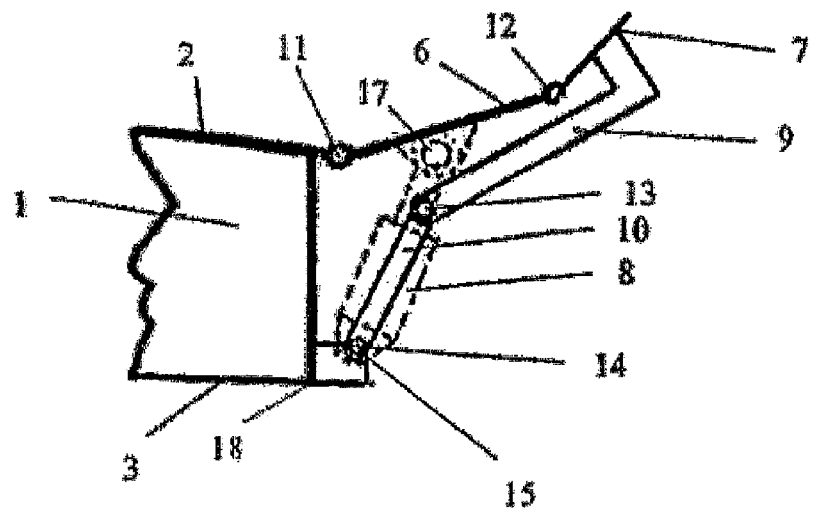
Figure 4B:
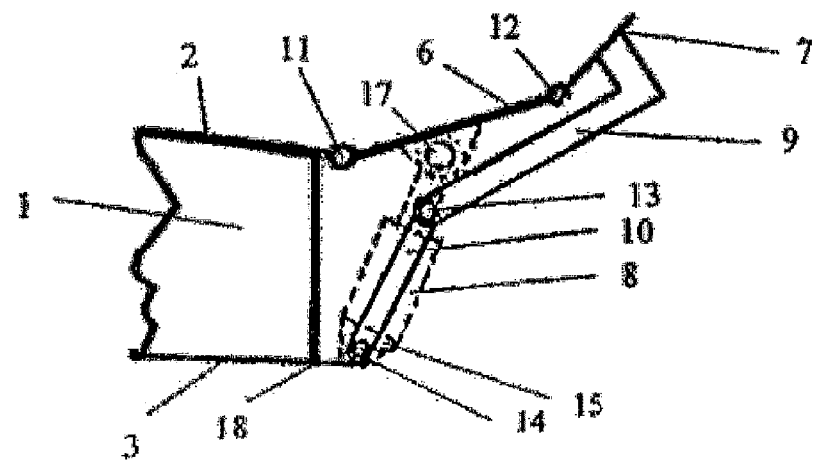

The embodiment shown in FIGS. 3A, 3B and 4A, 4B, in which an actuating device 8, 9, for actuating the spoiler 5 is illustrated in greater detail, features an actuator 8 that is coupled between the supporting structure of the main wing 1 and the spoiler 5, as well as a coupling mechanism 9, 10 that causes the rear segment 7 to be adjusted relative to the air flow by a greater angle than the front segment 6 during an adjustment of the spoiler 5, namely upward as shown in FIGS. 4A, 4B or downward as shown in FIGS. 3A, 3B.

In this particular embodiment, the actuator 8 is realized, in particular, in the form of a linear actuator of variable length that is coupled between an abutment 17 on the front segment 6 of the spoiler 5 and an abutment 15 on the supporting structure of the main wing 1, wherein the coupling mechanism 9, 10 is coupled between the rear spoiler segment 7 and the supporting structure of the main wing 1.

According to FIGS. 3A, 3B and 4A, 4B, the coupling mechanism 9, 10 comprises a toggle lever featuring a first lever 9 that is rigidly connected to the rear segment 7 and a second lever 10 that is coupled between the first lever 9 and, in this case, also the abutment 15 at articulations 13, 14. In this case, the first lever 9 is rigidly connected to the lower side of the rear spoiler segment 7 and bent at a right angle such that it extends forward underneath the front spoiler segment 6, wherein the front end of the first lever 9 is coupled to one end of the second lever 10 by means of a first coupling articulation 13, and wherein the second lever 10 is arranged in an angled fashion relative to the first lever 9 and fixed on said abutment 15 with its other end by means of a second coupling articulation 14. In the angled state of the toggle lever 9, 10 shown in FIGS. 3A, 3B, the first lever 9 extends more or less parallel to the first spoiler segment 6 up to the vicinity of the first spoiler articulation 11 that connects the front spoiler segment 6 to the supporting structure of the main wing 1, wherein the second lever 10 extends away from the first segment 6 in an angled fashion referred to the first lever 9 as shown in FIGS. 3A, 3B and 4A, 4B. The toggle lever 9, 10 forms a step-up gear that causes the rear segment 7 to be respectively adjusted upward or downward by a greater angle than the front segment 6 as shown in FIGS. 3 and 4 when the spoiler 5 is actuated by the actuator 8. When the toggle lever 9, 10 is stretched due to an upward adjustment of the first spoiler segment 6 by means of the actuator 8, the second spoiler segment 7 is upwardly adjusted by a greater angle as shown in FIGS. 4A, 4B while a more significant angling of the toggle lever 9, 10 due to a downward adjustment of the first spoiler segment 6 by means of the actuator 8 causes the second spoiler segment 7 to be downwardly adjusted by a greater angle as shown in FIGS. 3A, 3B.

The abutment 15, on which the second lever 10 is fixed by means of the second coupling articulation 14, is arranged on the supporting structure 18 of the main wing 1 in the embodiment shown in FIG. 3A and FIG. 4A, namely at the base point of the actuator 8, at which this actuator is connected to the supporting structure 18 of the main wing 1. The abutment 15 may also be formed by the base point of the actuator 8 as shown in FIGS. 3B and 4B.

The spoiler 5 therefore can be adjusted upward in the sense of a lift reduction, wherein the rear segment 7 is upwardly adjusted relative to the air flow by a greater angle than the front segment 6 as shown in FIGS. 4A, 4B. On the other hand, the spoiler 5 can also be adjusted downward into the gap 16 in the sense of a lift increase when the high-lift surface 4 is extended as shown in FIG. 2, wherein the rear segment 7 is downwardly adjusted relative to the air flow by a greater angle than the front segment 6 as shown in FIGS. 3A, 3B.

In the embodiment shown in FIGS. 5 and 6, the actuating device for actuating the spoiler 5 comprises two actuators 81, 82 which cause the rear segment 7 to be adjusted relative to the air flow by a greater angle than the respective front segment 6 during an adjustment of the spoiler 5, namely upward as shown in FIG. 5 or downward as shown in FIG. 6.

In this embodiment, the actuators 81, 82 are once again realized, in particular, in the form of linear actuators of variable length. A first actuator 81 is coupled between an abutment 17 on the front segment 6 of the spoiler 5 and an abutment 15 on the supporting structure of the main wing 1 while the second actuator 82 is coupled between the front spoiler segment 6 and the rear spoiler segment 7, namely between an abutment 25 on the front segment 6 and an abutment 27 on the rear segment 7. The actuating device formed by the two actuators 81, 82 in cooperation with the abutments 15, 17, 25, 27 is designed such that an upward adjustment of the first spoiler segment 6 by means of the first actuator 81 causes the second actuator 82 to upwardly adjust the second spoiler segment 7 by a greater angle as shown in FIG. 5, wherein a downward adjustment of the first spoiler segment 6 by means of the first actuator 81 causes the second actuator 82 to downwardly adjust the second spoiler segment 7 by a greater angle as shown in FIG. 6.

The spoiler 5 therefore can be adjusted upward in the sense of a lift reduction, wherein the rear segment 7 is upwardly adjusted relative to the air flow by a greater angle than the front segment 6 as shown in FIG. 5. On the other hand, the spoiler 5 can also be adjusted downward into the gap 16 in the sense of a lift increase when the high-lift surface 4 is extended as shown in FIG. 2, wherein the rear segment 7 is downwardly adjusted relative to the air flow by a greater angle than the front segment 6 as shown in FIG. 6.

The abutments 17 in the two embodiments illustrated in FIGS. 3A, 3B and 4A, 4B and FIGS. 5 and 6, respectively, as well as the abutments 25 and 27 in the embodiment illustrated in FIGS. 5 and 6 are respectively positioned relative to the spoiler elements 6 and 7 in such a way that a corresponding lever is formed, on which the respective actuators 8 or 81 and 82 can engage in order to realize the desired pivoting movement or adjustment of the respective spoiler segments 6 and 7.

This applies accordingly to the location, at which the first lever 9 of the embodiment illustrated in FIGS. 3A, 3B and 4A, 4B is rigidly connected to the lower side of the rear spoiler segment 7.

The inventive spoiler makes it possible to increase the lifting power without additional control surfaces, i.e., essentially without additional weight or increased complexity of the system. When using a forced coupling as shown in FIGS. 3A, 3B and 4A, 4B or another coupling, it is possible to realize different angles of excursion of the respective spoiler segments without requiring additional actuators or control systems, wherein the utilization of independent actuators, e.g., as in the embodiment shown in FIGS. 5 and 6 provides greater freedom in realizing a different adjustment of the respective spoiler segments relative to one another.

The lift of an aerodynamically active surface increases with the curvature/convexity of the surface, over which the air flows (only the curvature transverse to the flow is effective). At a constant gap width (or even without a gap), the following flap 7 also needs to be lowered with a more significant spoiler excursion. This increases the spacing between the highest point of the overall system and the connecting line between the front edge of the front spoiler segment 6 and the rear edge of the rear segment 7. In accordance with its definition, this spacing is proportional to the convexity of the system. The lift is increased by increasing the flow speed on the upper side of a surface, over which the air flows, relative to the surroundings. The magnitude of the subsequently required "delay/distance" (to approximately the ambient speed at the end of the system)—and therefore also the attainable lift increase—is subject to physical limitations. One peculiarity of an air flow over a bend as a borderline case of a curvature is that the value of the super velocity depends on the bending angle. Two successively arranged bends that are spaced apart from one another by a sensible distance and have the same angular sum as a single bend create smaller localized super velocity peaks and therefore fewer delay problems or allow a greater limiting sum while the problem severity remains the same.

Figure 1:
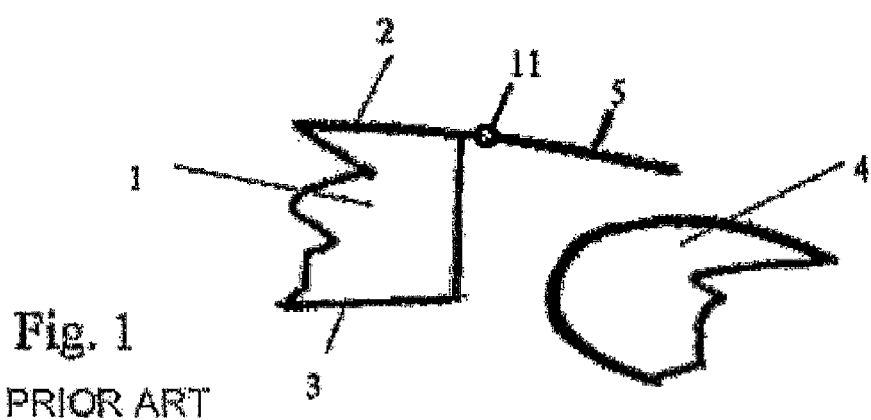
FIG. 1 shows the principle of conventional spoiler kinematics according to the state of the art in the form of a schematic cross-sectional representation, wherein the spoiler is illustrated in the lowered position on the airfoil of an aircraft with extended high-lift flap.

The flow through the gap 16 of the high-lift system is complex. The inner side of the spoiler 6, 7 and the contour on the upper side of the flap or high-lift surface 4 form a channel in the form of a gap 16 that should always have the cross-sectional shape of a "nozzle" up to the rear edge of the spoiler 6, 7 in all flap positions, i.e., its cross section is reduced rather than enlarged in the downstream direction. With respect to direction and size, the proposed spoiler shape apparently makes it possible to observe this better above the curved surface of the flap 4 than with a conventional one-piece spoiler 5 according to FIG. 1. This results in an improved usability of the flap and more flexibility in designing the flap contour.

The invention allows two alternatives for exhausting the improvement potential of the spoiler:
(i) the increased overall excursion with respect to the angle of excursion increases the aerodynamic effectiveness,
(ii) the excursion of the first spoiler segment 6 and therefore the size of the (first) actuator 8; 81 can be reduced at the same overall excursion with respect to the angle of excursion.

High Lift Function: increasing the lift in slow flight by
(i) increasing the wing convexity
(ii) improved gap adjustments with respect to the gap dimension and the gap geometry (this pertains to the gap 16 between the spoiler 6, 7 and the landing flap 4).

In addition, the invention provides additional degrees of freedom in the design of flaps and flap kinematics: the broad kinematic design freedom resulting from the construction allows significant movements of the rear spoiler edge, i.e., of the rear end of the second spoiler segment 7, in the Z-direction (upward/downward) such that the kinematic design freedom for the flap system is a broadened. During its conventional use, i.e., during an upward excursion for eliminating lift or for roll control purposes, the effectiveness of the spoiler is increased such that the overall spoiler surface can be reduced and advantages with respect to the required structural space can be achieved.

Due to the increased effectiveness of the spoiler and its function as a roll control surface and as a "lift dumper," it is possible to either reduce the overall spoiler surface or the angle of excursion. The former makes it possible to shorten the spoiler if the articulation line is fixed, i.e., the line on which the first spoiler segment 6 is supported on the main wing 1 by means of the first spoiler articulation 11, and therefore to realize a forward extension of the "shroud" line, i.e., the line on which the rear end of the spoiler 5 covers the high-lift surface 4, if such an extension is considered advantageous for the high-lift system, wherein it would also be conceivable to shift the articulation line 11 rearward if the "shroud" line is constant such that the rear spar of the main wing 1 can be shifted downstream and the size of the wing box can be increased.

LIST OF REFERENCE SYMBOLS

1 Main wing
2 Upper side
3 Underside
4 High-lift surface
5 Spoiler
6 First spoiler segment
7 Second spoiler segment
8 Actuator
81 First actuator
82 Second actuator
9 First lever
10 Second lever
11 First articulation of the spoiler
12 Second articulation of the spoiler
13 First articulation of the coupling mechanism
14 Second articulation of the coupling mechanism
15 Abutment
16 Gap
17 Abutment
25 Abutment
27 Abutment

The invention claimed is:

1. An aircraft aerodynamic body comprising:
an aircraft airfoil having supporting structure,
a spoiler supported on the aircraft airfoil, and
an actuating device,
wherein said spoiler is supported on the aircraft airfoil such that the spoiler is articulated about an axis extending transverse to an air flow direction and is adjustable relative to air flow, the spoiler comprising at least a front segment and a rear segment arranged behind one another with regards to the air flow direction, extending transverse to the air flow direction, connected to one another in an articulated fashion, and adjustable via the actuating device to different angles with regards to the air flow,
wherein the actuating device comprises an actuator and a coupling mechanism, the actuator being coupled between the supporting structure of the aircraft airfoil and the front segment of the spoiler, the coupling mechanism comprising a toggle lever comprising a first lever rigidly connected to the rear segment and comprising a second lever, the second lever being coupled to the first lever at a first articulation and coupled to an abutment at a second articulation, the abutment being on the supporting structure or being formed by a base point of the actuator,
wherein the toggle lever forms a step-up gear, the step-up gear causing the rear segment to be adjusted by a greater angle than the front segment when the spoiler is actuated by the actuator,
wherein the aircraft airfoil comprises a main wing having a rear side with regards to an air flow direction and comprises a high-lift surface arranged on the rear side of the main wing, wherein said high-lift surface is extendable from a retracted position such that a gap conducting air from an underside of the main wing to an upper side of the high-lift surface is exposed between the main wing and the high-lift surface, and wherein the spoiler is arranged on an upper side of the main wing and is pivotable about an axis extending in a wingspan direction of the airfoil,
wherein the spoiler is adjustable upward from the upper side of the main wing to reduce lift such that the rear segment is upwardly adjusted relative to the air flow by a greater angle than the front segment, and wherein the spoiler is adjustable downward from the upper side of the main wing into the gap to increase lift when the high-lift surface is extended such that the rear segment is downwardly adjusted relative to the air flow by a greater angle than the front segment.

2. The aircraft aerodynamic body according to claim 1, wherein the first lever is rigidly connected to a lower side of the rear segment of the spoiler and bent at a right angle such that the first lever extends forward underneath the front segment of the spoiler, wherein the second lever has a first end and a second end, wherein the front end of the first lever is coupled to the first end of the second lever via the first articulation, wherein the second lever is arranged in an angled fashion relative to the first lever, wherein the second end of the second lever is fixed on the abutment via the second articulation.

3. A combination for an aircraft aerodynamic body having a main wing and supporting structure, the combination comprising:
a spoiler adapted to be supported on the aircraft aerodynamic body, and
an actuating device,
wherein the spoiler comprises at least a front segment and a rear segment arranged behind one another, connected to one another in an articulated fashion, and adjustable via the actuating device to different angles,
wherein the actuating device comprises an actuator and a coupling mechanism, the actuator being coupled to the front segment of the spoiler and adapted to be coupled to the supporting structure, the coupling mechanism comprising a toggle lever comprising a first lever rigidly connected to the rear segment and comprising a second lever coupled to the first lever and adapted to be coupled to an abutment being on the supporting structure or being formed by a base point of the actuator,
wherein the toggle lever forms a step-up gear, the step-up gear causing the rear segment to be adjusted by a greater angle than the front segment when the spoiler is actuated by the actuator,
wherein the spoiler is arranged on the upper side of the main wing and can be pivoted about an axis extending in the wingspan direction of the airfoil, wherein the spoiler is adjustable upward to reduce lift such that the rear segment is upwardly adjusted relative to the air flow by a greater positive angle than the front segment, and wherein the spoiler is adjustable downward into a gap to increase lift such that the rear segment is downwardly adjusted relative to the air flow by a greater negative angle than the front segment.

\* \* \* \* \*

UNITED STATES PATENT AND TRADEMARK OFFICE
CERTIFICATE OF CORRECTION

| | | |
|---|---|---|
| PATENT NO. | : 8,651,430 B2 | Page 1 of 1 |
| APPLICATION NO. | : 12/449705 | |
| DATED | : February 18, 2014 | |
| INVENTOR(S) | : Voss et al. | |

It is certified that error appears in the above-identified patent and that said Letters Patent is hereby corrected as shown below:

In particular, on the title page, Item [86], please change "September 9, 2009" to correctly read:
--September 2, 2009--

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,651,430 B2
APPLICATION NO. : 12/449705
DATED            : February 18, 2014
INVENTOR(S)      : Voss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Twenty-ninth Day of September, 2015

Michelle K. Lee
*Director of the United States Patent and Trademark Office*